(12) United States Patent
Zangerl et al.

(10) Patent No.: US 12,529,791 B2
(45) Date of Patent: Jan. 20, 2026

(54) RANGEFINDER FOR A TELESCOPE

(71) Applicant: Swarovski-Optik AG & Co KG., Absam (AT)

(72) Inventors: Rene Zangerl, Hall (AT); Lukas Klingenschmid, Wattens (AT)

(73) Assignee: Swarovski-Optik AG & Co KG, Absam (AT)

( * ) Notice: Subject to any disclaimer, the term of this patent is extended or adjusted under 35 U.S.C. 154(b) by 1076 days.

(21) Appl. No.: 17/547,468

(22) Filed: Dec. 10, 2021

(65) Prior Publication Data

US 2022/0187454 A1 Jun. 16, 2022

(30) Foreign Application Priority Data

Dec. 11, 2020 (AT) .............................. A 51080/2020

(51) Int. Cl.
| | | |
|---|---|---|
| *G01S 17/08* | (2006.01) | |
| *G01S 17/88* | (2006.01) | |
| *G02B 23/18* | (2006.01) | |
| *H03L 7/081* | (2006.01) | |
| *H03M 1/12* | (2006.01) | |

(52) U.S. Cl.
CPC .............. *G01S 17/08* (2013.01); *G01S 17/88* (2013.01); *G02B 23/18* (2013.01); *H03L 7/081* (2013.01); *H03M 1/124* (2013.01)

(58) Field of Classification Search
CPC .......... G01S 17/08; G01S 17/88; G02B 23/18
USPC ........................................................ 356/5.04
See application file for complete search history.

(56) References Cited

U.S. PATENT DOCUMENTS

| | | | | |
|---|---|---|---|---|
| 4,209,843 A | * | 6/1980 | Hyatt ................... | G05B 19/408 708/422 |
| 5,128,753 A | * | 7/1992 | Lemelson ........ | G08B 13/19634 382/218 |
| 9,719,780 B2 | | 8/2017 | Pernstich et al. | |
| 10,209,362 B2 | * | 2/2019 | Nazemi ................. | G01S 7/4861 |
| 10,288,735 B1 | | 5/2019 | Wang et al. | |
| 10,718,866 B2 | | 7/2020 | Wohlgenannt et al. | |
| 2012/0062286 A1 | * | 3/2012 | Ginsburg ............ | H03F 3/45188 327/147 |
| 2018/0106612 A1 | | 4/2018 | Mingshu et al. | |
| 2020/0077075 A1 | | 3/2020 | Denenberg et al. | |

FOREIGN PATENT DOCUMENTS

| | | |
|---|---|---|
| AT | 506437 A1 | 9/2009 |
| EP | 2378245 A1 | 10/2011 |
| EP | 3339901 A1 | 6/2018 |

OTHER PUBLICATIONS

European Search Report for Application No. 21212437.4 mailed May 12, 2022, 2 pages.

* cited by examiner

*Primary Examiner* — Daniel L Murphy
(74) *Attorney, Agent, or Firm* — Lerner David LLP (57) ABSTRACT

The invention relates to a rangefinder for a telescope having a transmitter and a transmission beam path and having a first receiver and a first receiver beam path, wherein the first receiver beam path extends at least partially in a first observation beam path of the telescope. The rangefinder additionally comprises a second receiver with a second receiver beam path which is aligned in parallel to the first transmission beam path, and which is arranged at a distance from the first observation beam path of the telescope.

19 Claims, 8 Drawing Sheets

RANGEFINDER FOR A TELESCOPE

CROSS REFERENCE TO RELATED APPLICATION

The present application claims priority from Austrian Patent Application No. A 51080/2020 filed on Dec. 11, 2020, the disclosure of which is hereby incorporated by reference.

BACKGROUND OF THE INVENTION

The invention relates to an electro-optical rangefinder and a method for measuring the distance of an object using an electro-optical rangefinder according to the preambles of claims 1, 15 and 18.

Electro-optical rangefinders for use in leisure activities or sporting activities, which may be designed as a separate device or being integrated into a binocular, are already known.

BRIEF SUMMARY OF THE INVENTION

It is the object of the present invention to create a rangefinder and a method for measuring the distance of an object by which a larger range and a more flexible use are allowed for.

This object is achieved by means of a device and a method according to the claims.

The object of the invention is achieved by an electro-optical rangefinder for a telescope having a transmitter and a transmission beam path and having a first receiver and a first receiver beam path, wherein the first receiver beam path extends at least partially in a first observation beam path of the telescope, and wherein a second receiver with a second receiver beam path, which is aligned in parallel to the transmission beam path, is formed, and wherein the second receiver beam path is arranged at a distance from the first observation beam path of the telescope.

According to a preferred embodiment of the rangefinder, it is provided that the second receiver beam path extends at least partially in a second observation beam path of the telescope.

Moreover, it is advantageous if the transmission beam path extends at least partially in the first observation beam path of the telescope. By these measures, it may be achieved overall that the parallel alignment of the two observation beam paths, the two receiver beam paths and the transmission beam path may be maintained more reliably. Moreover, when the rangefinder is manufactured, the adjustment of the beam paths with respect to their parallelism may be carried out with less effort.

In an advantageous advancement, it is provided that the rangefinder comprises evaluation electronics with an oscillator for generating a clock signal, with a first ADC (analog to digital converter) for the first receiver and with a second ADC for the second receiver.

In particular, an embodiment in which the first ADC is configured for generating digital values of a first intensity course of reflected radiation $IR1(t1_n)$, detected by the first receiver, at points in time $t1_n$ determined by the clock signal, and that the second ADC is configured for generating digital values of a second intensity course of reflected radiation $IR2(t2_n)$, detected by the second receiver, at points in time $t2_n$ determined by the clock signal, is advantageous.

The advancement of the rangefinder, according to which the evaluation electronics comprises a phase shifter for generating a variable time difference $\Delta t_v$ between the points in time $t1_n$ of an activation of the first ADC and the points in time $t2_n$ of an activation of the second ADC, has the advantage that hence the two receivers are synchronized and thus these may be effectively interconnected to a single receiver.

An advancement in which the phase shifter comprises a phase-locked loop (PLL) is also advantageous.

According to an alternative embodiment of the rangefinder, it is provided that the phase shifter comprises a delay line with a defined line length.

Moreover, the embodiment of the rangefinder in which it is designed having a controller having a processor, preferably having an FPGA (field programmable gate array), is also advantageous. Any electronic component, which can be programmed and can evaluate data, such as an ASIC, a microcontroller, a microprocessor, or a digital signal processor DSP, is to be considered a processor.

In an advantageous advancement, the rangefinder is designed having an operator terminal connected to the controller, wherein the operator terminal is suitable for selecting different operating modes.

It proves particularly advantageous if a first operating mode, in which the digital values of the detected radiation intensities of the two receivers are added to a summed value in a synchronized manner, and a second operating mode, in which sampling of the reflected radiation intensity by the two receivers is performed alternately shifted in phase by half a period T, are provided.

According to an advantageous design of the rangefinder, it is provided that it comprises evaluation electronics with an oscillator for generating a clock signal, having a summing amplifier for adding the measurement signals from the two receivers to a sum signal and having an ADC for converting the sum signal.

By the advancement of the rangefinder, in which a phase shifter is arranged between the first receiver and the summing amplifier, a reduction in measurement errors may be achieved.

In particular, an embodiment of the rangefinder in which the phase shifter comprises a delay line with a defined line length is advantageous.

The object of the invention is also independently achieved by a method for measuring the distance of an object with an electro-optical rangefinder, wherein radiation is emitted by a transmitter and the radiation is directed onto the object by a transmission beam path, and wherein radiation reflected by the object is detected by a first receiver, and wherein a temporally changeable intensity course of the reflected radiation IR1(t) detected by the first receiver is recorded, and wherein the distance of the object is calculated from a run time of the radiation from the transmitter to the first receiver, and wherein radiation reflected by the object is detected by a second receiver and a temporally changeable intensity course of the reflected radiation IR2(t) detected by the second receiver is recorded. From the first intensity course IR1(t), digital values of the first intensity course $IR1(t1_n)$ are generated by a first ADC at points in time $t1_n$ determined by a clock signal. From the second intensity course IR2(t), digital values of the second intensity course $IR2(t2_n)$ are generated by a second ADC at points in time $t2_n$ determined by the clock signal, wherein the points in time $t2_n$ as compared to the points in time $t1_n$ are phase-shifted by a time difference $\Delta t$, i.e. $t2=t1+\Delta t$, wherein the time difference $\Delta t$ is composed of a system-caused part $\Delta t_s$ and a variable part $\Delta t_v$ and thus $\Delta t=\Delta t_s+\Delta t_v$. In this regard, the parts $\Delta t_s$ and $\Delta t_v$ as well as $\Delta t$ may assume both positive and negative values.

In particular, the approach is advantageous according to which a value of the variable time difference $\Delta t_v$ is selected to be so high that the points in time $t1_n$ and $t2_n$ each correspond to an equal point in time of the intensity courses of the reflected radiation IR1(t), IR2(t) at the first receiver and at the second receiver, and that subsequently the values of the first intensity course IR1($t1_n$) and the values of the second intensity course IR2($t2_n$)=IR2($t1_n$) are each added up to one another.

According to an alternative approach, a value of the variable time difference $\Delta t_v$ is selected to be so high that the points in time $t1_n$ and $t2_n$ each correspond to points in time of the intensity courses of the reflected radiation IR1(t), IR2(t) at the first receiver and at the second receiver, which are phase-shifted to one another by the value of half a period T of the clock signal. Subsequently, from the values of the first intensity course IR1($t1_n$) and from the values of the second intensity course IR2($t2_n$), a total intensity course IR($t_n$) with double the temporal resolution, in the form IR1($t1_n$), IR2($t1_n$+T/2), IR1($t1_{n+1}$), IR2($t1_{n+1}$+T/2), IR1($t1_{n+2}$), IR2($t1_{n+2}$+T/2), and so on, is formed.

The object of the invention is also independently achieved by a method for measuring the distance of an object with an electro-optical rangefinder, wherein radiation is emitted by a transmitter and the radiation is directed onto the object by a transmission beam path, and wherein radiation reflected by the object is detected by a first receiver, and wherein a temporally changeable intensity course of the reflected radiation IR1(t) detected by the first receiver is recorded, and wherein the distance of the object is calculated from a run time of the radiation from the transmitter to the first receiver. In this regard, radiation reflected by the object is detected by a second receiver and a temporally changeable intensity course of the reflected radiation IR2(t) detected by the second receiver is recorded, wherein measurement signals from the first receiver are phase-shifted by a variable time difference $\Delta t_v$ relative to measurement signals from the second receiver.

In particular, the approach is advantageous according to which a value of the variable time difference $\Delta t_v$ is selected to be so high that points in time corresponding to the measurement signals IR1(t) and IR2(t) each correspond to an equal point in time of the intensity courses of the reflected radiation IR1(t), IR2(t) at the first receiver and at the second receiver, and that subsequently the measurement signals of the intensity courses of the reflected radiation IR1(t) and IR2(t) are added up by a summing amplifier to a sum signal.

For the purpose of better understanding of the invention, it will be elucidated in more detail by means of the figures below.

BRIEF DESCRIPTION OF THE DRAWINGS

These show in a respectively very simplified schematic representation.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
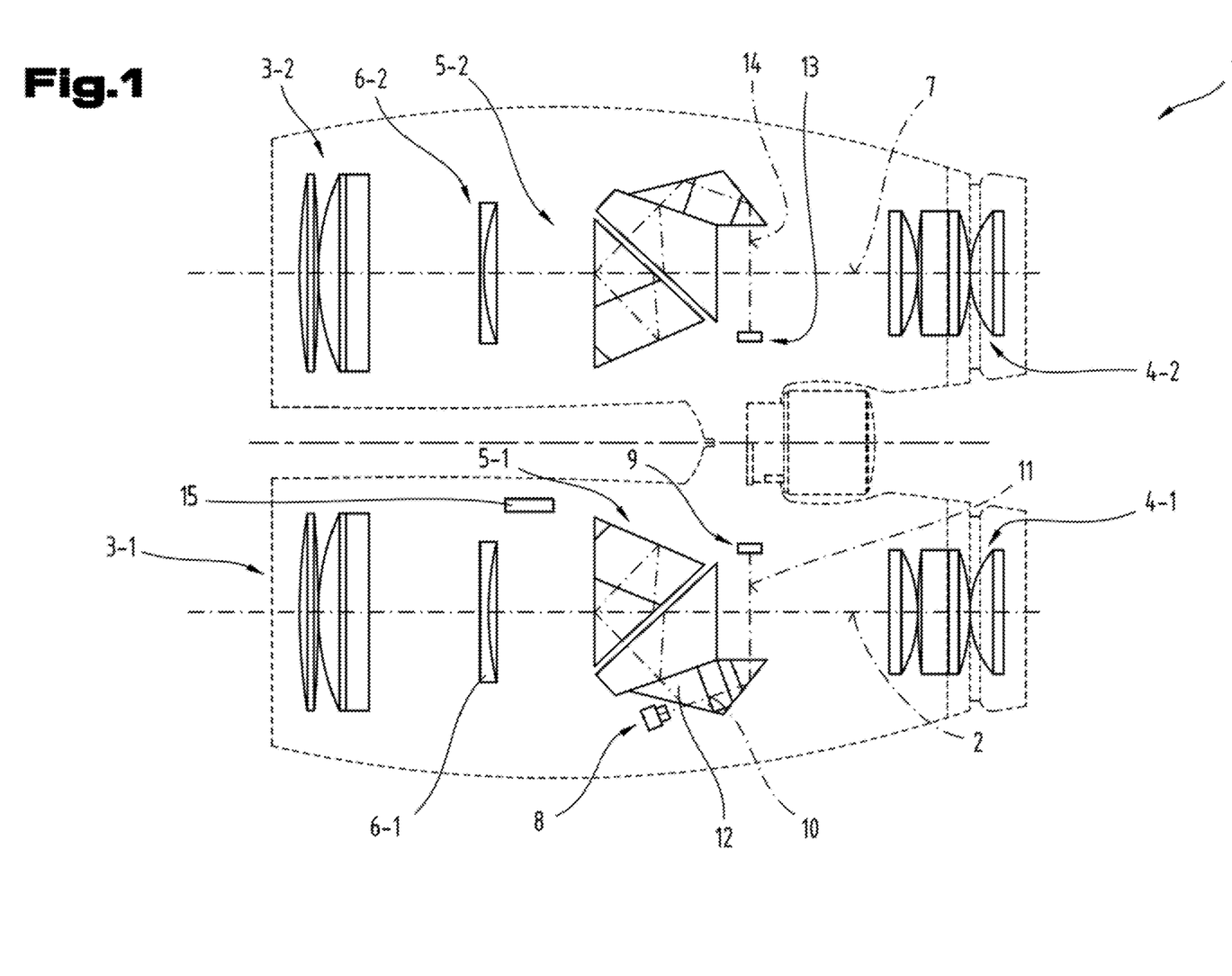
FIG. 1 an electro-optical rangefinder in the form of a binocular.

FIG. 1 shows an electro-optical rangefinder 1 in the form of a binocular. It comprises a first observation beam path 2, which extends between an objective lens 3-1 and an eyepiece 4-1, in a first tube. Furthermore,—in known manner— an erecting system 5-1 formed by a prism system and a focusing lens 6-1 are arranged in the course of the observation beam path 2. In parallel to the first observation beam path 2, a second observation beam path 7 formed in analogous manner is provided.

The electro-optical rangefinder 1 comprises a transmitter 8 and a first receiver 9, wherein a transmission beam path 10 of the transmitter 8 as well as a first receiver beam path 11 of the first receiver 9 may extend at least partially in the first observation beam path 2. For this purpose, radiation emitted by the transmitter 8 is coupled into the first observation beam path 2 with the aid of a beam splitting prism 12 at a border surface of the erecting system 5-1. This is carried out such that the radiation is emitted through the objective lens 3-1 towards a distant object. In reverse direction, radiation reflected by the distant object then passes through the objective lens 3-1 into the first observation beam path 2 and is decoupled from the first observation beam path 2 at a boundary surface of the reversal system 5-1. The radiation lastly passes through the first receiver beam path 11 to the receiver 9, by which the radiation is detected.

According to this exemplary embodiment, the binocular and/or the rangefinder 1 additionally comprises a second receiver 13, which is arranged in the second tube of the binocular and is coupled to the second observation beam path 7. In this regard, in like manner as with the first observation beam path 2, radiation reflected by a distant object passes through a second observation beam path 14 to the second receiver 13, wherein the radiation first enters the second observation beam path 7 of the binocular through the objective lens 3-2 of the second tube. In this regard, the reflected radiation is decoupled from the second observation beam path 7 at a boarder surface of the erecting system 5-2.

To control the transmitter 8 and to detect the measurement signals from the two receivers 9, 13, the rangefinder 1 comprises a control and evaluation unit 15.

Figure 2:
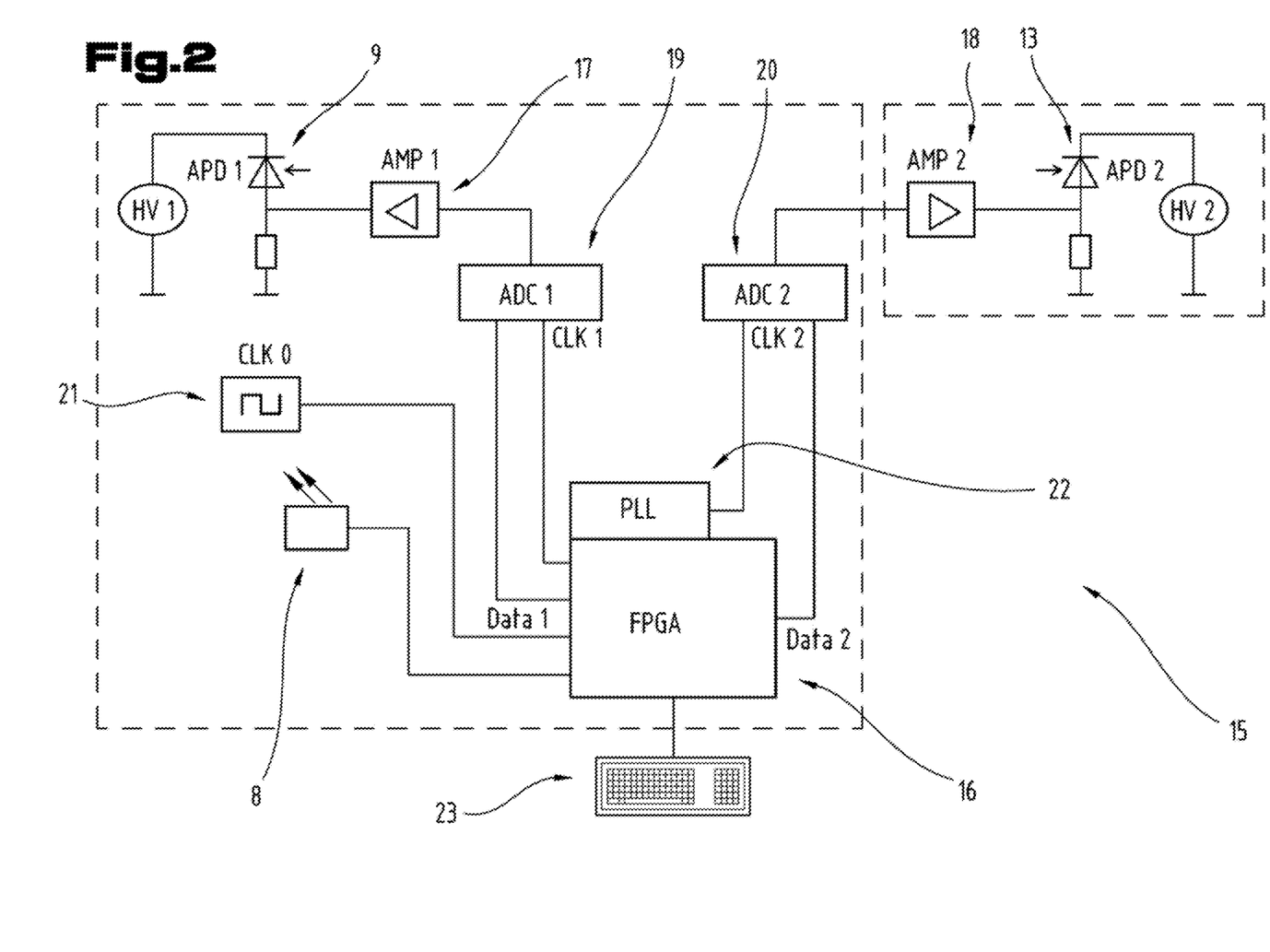
FIG. 2 a simplified schematic diagram of the control and evaluation unit of the rangefinder according to FIG. 1.
Figure 3:
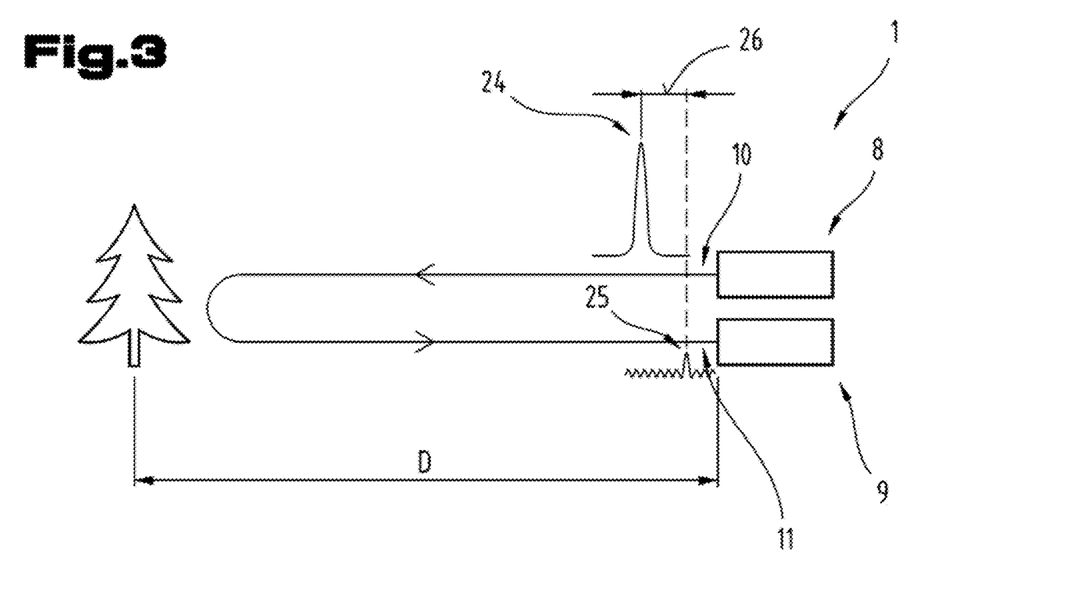
FIG. 3 a schematic representation of the functional principle of the electro-optical rangefinder.
Figure 4:
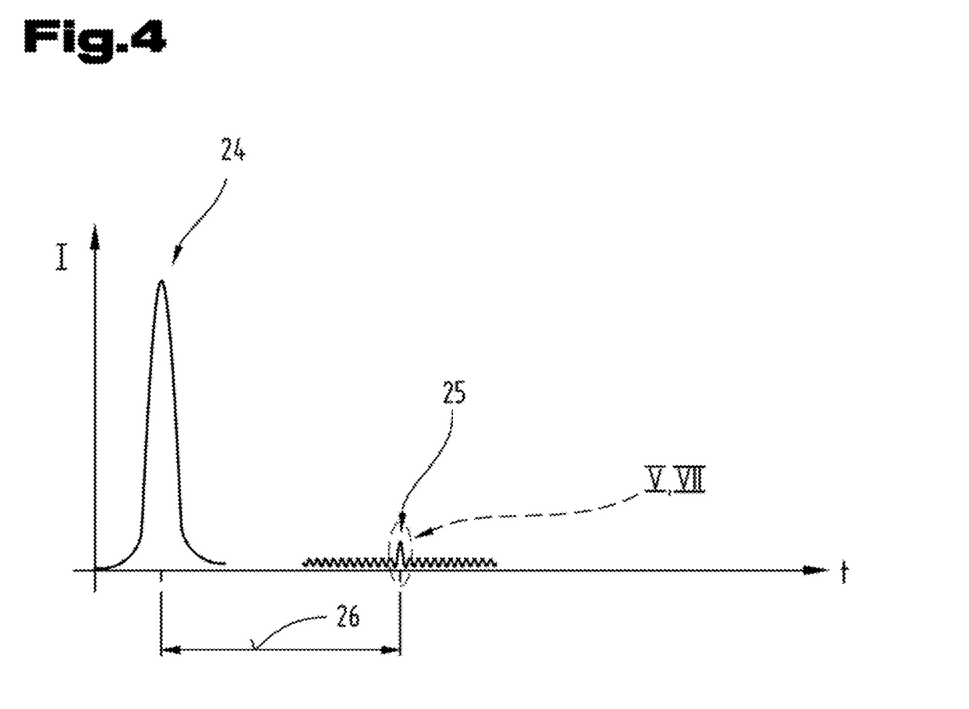
FIG. 4 a diagram of the radiation intensity course of the emitted laser pulse and the reflected radiation pulse.

FIG. 2 shows the control and evaluation unit 15 of the rangefinder 1 according to FIG. 1, shown as a simplified schematic diagram. To measure the distance of a distant object, the control and evaluation unit 15 of the rangefinder 1 causes the emission of radiation from the transmitter 8 in the direction onto the distant object. Then, the distance is calculated from the difference of the times of emission of the radiation and the arrival of the radiation reflected by the distant object at the receivers 9, 13 (FIGS. 3, 4). For this purpose, the control and evaluation unit 15 comprises a controller 16 by which the course of measurement is controlled and the evaluation is performed. Triggering such a measurement process is carried out at the instance of a user who aims at the object to be measured with the binocular and/or with the rangefinder 1 and starts the measurement by actuating a corresponding switch.

According to this exemplary embodiment of the electro-optical rangefinder 1, the transmitter 8 is formed by a laser. In this regard, the emission of the radiation from the transmitter 8 takes place in the form of short laser pulses 24 (FIGS. 3, 4). Avalanche photodiodes are provided as receivers 9, 13. Intensity courses of the reflected radiation detected by these receivers 9, 13 are provided to a digital evaluation by the controller 16 as analog measurement signals after corresponding amplification (by amplifiers 17, 18). In this regard, the radiation detected by the receivers 9, 13, besides the reflected radiation from the emitted laser pulse, naturally also contains proportions of ambient light (reflected radiation pulse 25, FIG. 4), which cause a great noise component and complicate an evaluation. With the aid of a first ADC 19 and a second ADC 20 (ADC . . . analog to digital converter), the analog measurement signals of the intensity courses from the receivers 9, 13 are transferred into digital values and/or digital measurement data. For this purpose, the control and evaluation unit 15 of the rangefinder 1 comprises an oscillator 21 for generating a clock signal. By this clock signal of the oscillator 21, discrete points in time are determined at which a sampling of the analog measurement values from the receivers 9, 13 is performed with the aid of the first ADC 19 and the second ADC 20.

By the additional use of the second receiver 13 in the second tube of the binocular and/or the rangefinder 1, in general, the advantage of an effective receiving area of the receivers 9, 13 of approximately twice the size may be achieved by their measurement signals being added to the reflected radiation. Thus, at equal performance of the transmitter 8, a corresponding increase in the maximum reach of the rangefinder 1 may be achieved. Regarding the possibility of adding digital measurement values from both analog to digital converters (first ADC 19, second ADC 20) in the correct way, possible differences in signal run times to the two analog to digital converters are to be considered. Such differences may for example be caused by different line lengths between the receivers 9, 13 and the respective analog to digital converters ADC 19, 20 in the controller 16. However, possible difference in the specific electronic components themselves, such as in the avalanche photodiodes of the receivers 9, 13 and the amplifiers 17, 18, which may have different temporal delays depending on their construction, also have to be taken into consideration. This means that a digital value of the intensity of the reflected radiation IR1($t1_n$) generated by the first ADC 19 at a point in time $t1_n$ determined by the clock signal of the oscillator 21 actually corresponds to an earlier point in time corresponding to the signal run time and/or to a corresponding point in time earlier by different delays in the electronic components (results in a total system-related delay $\Delta t_s$) and is to be assigned to this earlier point in time. This applies in like manner to a digital value of the intensity of the reflected radiation IR2($t2_n$) generated by the second ADC 20.

According to the invention, it is provided in the electro-optical rangefinder 1 that the controller 16 comprises a phase shifter 22 for generating a variable time difference $\Delta t_v$ between the points in time $t1_n$ of an activation of the first ADC 19 and the points in time $t2_n$ of an activation of the second ADC 20. Hence, it may be achieved that digital values of the first ADC 19 and the second ADC 20 are each added up to one another to a sum value, which correspond to the intensities of reflected radiation detected by the first receiver 9 and the second receiver 13 in each case to the same point in time.

In this regard, the use of the phase shifter 22 for generating the variable time difference $\Delta t_v$ results in a synchronization of the digital measurement values obtained from the first receiver 9 and the second receiver 13. Hence, it is achieved that the values of radiation intensities detected at different times by the first receiver 9 and the second receiver 13 are not erroneously added together to form a sum value. Only hence do the two receivers 9, 13 effectively obtain the effect of a single receiver with a receiving area of approximately twice the size.

Figure 11:
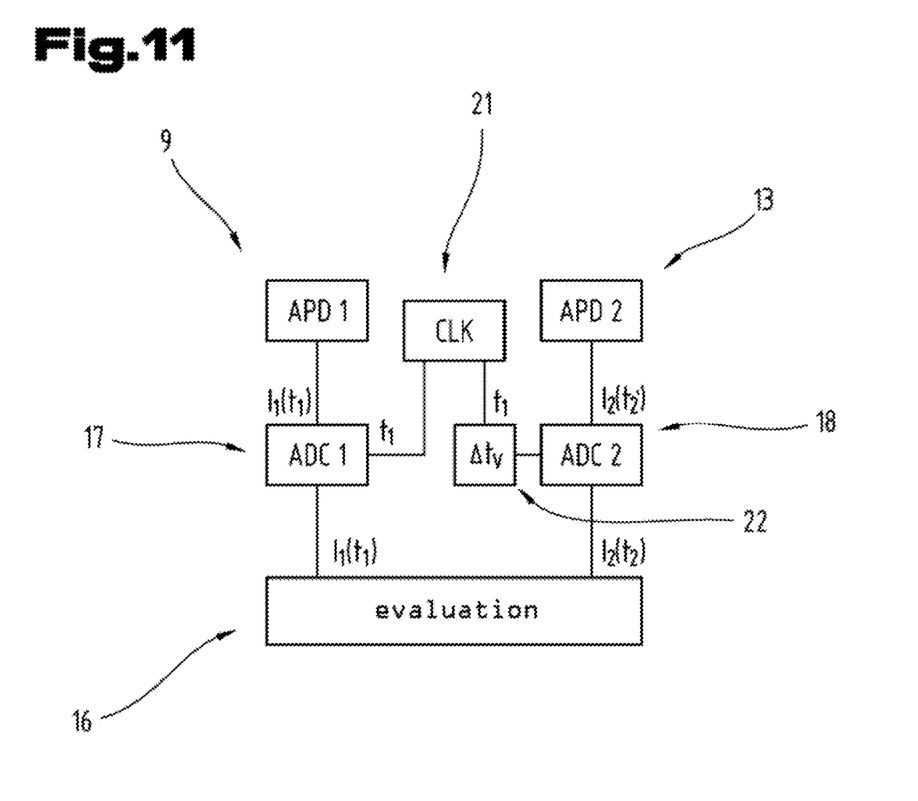
FIG. 11 a simplified representation of the control and evaluation unit of the rangefinder according to FIG. 2.

To clarify this, reference is made to FIG. 11 where the components of the control and evaluation unit 16 of the rangefinder 1 (FIG. 2) are provided with corresponding points in time and/or intensities. Using the designation $\Delta t_v$ for the variable time difference generated by the phase shifter 22 and $\Delta t_s$ for the system-caused temporal delay, the relationship may be described as follows. If the intensities IR1(t1) and Ir2(t2) are to be added up in the correct way, they must have been detected by the receivers 9, 13 at an equal point in time, i.e. t2=t1. However, due to the system-related temporal delay $\Delta t_s$, now an intensity IR2(t2') at a different point in time t2'=t1+$\Delta t_s$ would result for the second receiver 13. Taking into consideration the variable time difference $\Delta t_v$ generated by the phase shifter 22, the value of the point in time t2 results in t2=t2'+$\Delta t_v$. This further results in t2=t2'+$\Delta t_v$=t1+$\Delta t_s$+$\Delta t_v$.

Thus, starting out from this designation, in order to meet the requirement t2=t1, it must apply that $\Delta t_v$=−$\Delta t_s$. Hence, the fact is expressed that the system-caused temporal delay $\Delta t_s$ is compensated by the variable time difference $\Delta t_v$ generated by the phase shifter 22 and thus $\Delta t$=0.

According to a preferred embodiment of the electro-optical rangefinder 1, the controller 16 comprises a so-called FPGA (field programmable gate array). Besides controlling, the evaluation of measurement signals up to the calculation and display of the distance may be performed by the FPGA. Preferably, a so-called phase locked loop (PLL) is used as the phase shifter 22. Alternatively, the phase shifter 22 may be formed by a digital PLL, in short DPLL. In this regard, it is also possible that the FPGA comprises the PLL. According to an alternative embodiment, the phase shifter 22 comprises a delay line.

The measurement of the distance of a distant object is carried out using the electro-optical rangefinder 1 comprising the first receiver 9 and the second receiver 13 in such a manner that digital values of the first intensity course IR1($t1_n$) are generated from the first intensity course IR1(t) by the first ADC 19 at points in time $t1_n$ determined by the clock signal of the oscillator 21 and digital values of the second intensity course IR2($t2_n$) are generated from the second intensity course IR2(t) by the second ADC 20 at points in time $t2_n$ determined by the clock signal, wherein the points in time $t1_n$ are phase-shifted by a time difference $\Delta t$ as compared to the points in time $t2_n$, wherein the time difference $\Delta t$ is composed of a system-caused part $\Delta t_s$ and a variable part $\Delta t_v$. The values of the first intensity course $IR1(t1_n)$ and the values of the second intensity course $IR2(t2_n)$ are recorded and subsequently each added to a sum value by the controller 16. The thus obtained digital data of the temporally changeable intensity course of the reflected radiation from the receivers 9, 13 then forms the basis for calculating the distance from the run time of the radiation from the transmitter 8 to the receivers 9, 13. Recording and further processing the digital measurement data and the subsequent calculation of the distance from this measurement data is carried out by the controller 16 based on corresponding programs stored in the controller 16.

In the described approach according to the first embodiment, digital data of the detected radiation intensity at equal points in time is added up to a sum value. The temporal sequence of radiation intensity values $IR1(t1_n)$, $IR1(t1_{n+1})$, $IR1(t1_{n+2})$, ... also referred to as digital signal vector has a temporal resolution corresponding to a period T of the clock signal of the oscillator 21. This analogously applies to the temporal sequence of the radiation intensity values $IR2(t2_n)$, $IR2(t2_{n+1})$, $IR2(t2_{n+2})$, ... of the second ADC 20. The sequence of the respective added up intensity values of the summed up digital signal vector $IR1(t1_n)+IR2(t1_n)$, $IR1(t1_{n+1})+IR2(t1_{n+1})$, $IR1(t1_{n+2})+IR2(t1_{n+2})$, and so on, has the same temporal resolution.

According to an alternative exemplary embodiment of the electro-optical rangefinder 1, it is provided that when the digital values of the intensity course of the reflected radiation are generated by the first ADC 19 and by the second ADC 20, an additional phase shift of the length of half a period T of the clock signal of the oscillator 21 is provided. As opposed to the exemplary embodiment of the method described first, in this regard, no addition of digital data of the first ADC 19 and the second ADC 20 is performed. Instead, a digital signal vector with double the temporal resolution is formed from the digital signal vectors of the first ADC 19 and the second ADC 20 by the controller 16. This means that the points in time of sampling of the digital values of the radiation intensities by the first ADC 19 and by the second ADC 20 are interleaved by the phase shifter, such that a digital signal vector in the form $IR1(t1_n)$, $IR2(t1_n+T/2)$, $IR1(t1_{n+1})$, $IR2(t1_{n+1}+T/2)$, $IR1(t1_{n+2})$, $IR2(t1_{n+2}+T/2)$, ... is formed. It thus contains a sequence of digital values of the detected radiation intensity from the first receiver 9 and the second receiver 13, wherein the values of the first ADC 19 and the second ADC 20 follow one another alternately. Hence, the temporal intensity course of the reflected radiation is effectively recorded at twice as high of a sampling rate as corresponds to the frequency of the clock signal of the oscillator 21. Based on the thus generated digital signal vector of twice the sampling rate, the controller 16 subsequently calculates the value of the distance.

Again taking into consideration the symbolic representation of the FIG. 11, the formal relationship may be expressed as follows. The intensities IR1(t1) and IR2(t2) detected by the two receivers 9, 13 should have been detected at points in time t1 and t2, which differ from one another by the length of half a period T of the clock signal of the oscillator 21, i.e. $t2=t1+T/2$, thus $\Delta t=T/2$. Taking into consideration the system-caused temporal delay $\Delta t_s$ and the variable time difference $\Delta t_v$ generated by the phase shifter 22, as already taken into consideration in the description of the first operating mode, what results in this case is $t2=t1+\Delta t_s+\Delta t_v=t1+T/2$.

The value for the variable time difference to be generated by the phase shifter 22 resulting from this is $\Delta t_v=T/2-\Delta t_s$.

According to a preferred embodiment variant of the electro-optical rangefinder 1, it is designed for optional execution of different operating modes. For this purpose, the rangefinder 1 comprises a keyboard and/or an operator terminal 23 which is connected to the controller 16. A user of the rangefinder 1 hence has the possibility to switch the rangefinder 1 between different operating modes by determining the execution of a corresponding program by the controller 16 by selection via the keyboard 23. Besides the operating modes of the rangefinder 1 already described above, namely those in which digital values of the detected radiation intensities of the two receivers 9, 13 are added up to a sum value and, on the hand, those operating modes in which the sampling of the reflected radiation intensity is performed alternately phase-shifted by half a period, it is also possible to perform the distance measurement using merely the second receiver 13 in the second observation beam path 7. This means that in this third operating mode of the rangefinder 1, the first receiver 9 in the first observation beam path 2 is out of operation and is not used. This third operating mode of the rangefinder 1 proves particularly advantageous for measuring the distance of objects at a relatively small distance. So-called optical crosstalk, as may occur between the transmitter 8 and the first receiver 9, which are located in the first observation beam path 2, are thus prevented whereby erroneous measurements can be prevented more easily.

For the described electro-optical distance measurement, preferably a plurality of laser pulses is emitted by the transmitter 8. The emission of the laser pulses is performed at a high frequency of, for example 56 kHz. By summing up the reflected radiation of many individual pulses, such as over 1024 individual measurements, the quality of the measurement signal is significantly improved, and evaluation is made easier. In this regard, as in the measurement, the evaluation is performed with an individual pulse but after summing and is applied to the sum signal.

In the described exemplary embodiments, a value of the frequency of the oscillator 21 of preferably 80 MHz is provided. According to this frequency, sampling of the reflected radiation and/or the laser pulses is performed at a temporal resolution of T=12.5 ns.

By means of FIGS. 3 and 4, the general functional principle of the electro-optical distance measurement is briefly illustrated. An object (tree) located at a distance D is measured by the rangefinder 1 by the transmitter 8 emitting a laser pulse 24 onto the object through the transmission beam path 10. A reflected radiation pulse 25 bounced back therefrom then passes through the receiver beam path 11 back into the rangefinder 1 and is detected by the receiver 9. By the points in time of the emission of the laser pulse 24 and receiving of the reflected radiation pulse 25, a pulse run time 26 is determined the product of which with the light speed, as is known, is equal to twice the value of the distance D of the object to be measured.

FIG. 4 shows a diagram of the temporal course of the radiation intensity of the emitted laser pulse 24 and the reflected radiation pulse 25 in their temporal relation to one another. As is symbolically indicated by the representation of the reflected radiation pulse 25 in FIG. 4, besides a proportion of the radiation of the reflected laser pulse 24 it additionally contains proportions originating from the natural ambient radiation as an interfering signal. Thus, the point in time in the range of the maximum of the intensity of the reflected radiation pulse 25 is taken as a reference as the end of the pulse run time 26. This relatively high proportion of artifacts in the intensity course of the reflected radiation pulse 25 requires the measurement of the reflected radiation to be repeated with a plurality of laser pulses 24. By corresponding summing up over many individual measurements, the noise and/or the interfering signal component can be reduced. In other words: The signal-to-noise ratio (SNR) in the measured intensity course is thereby significantly increased.

Figure 5:
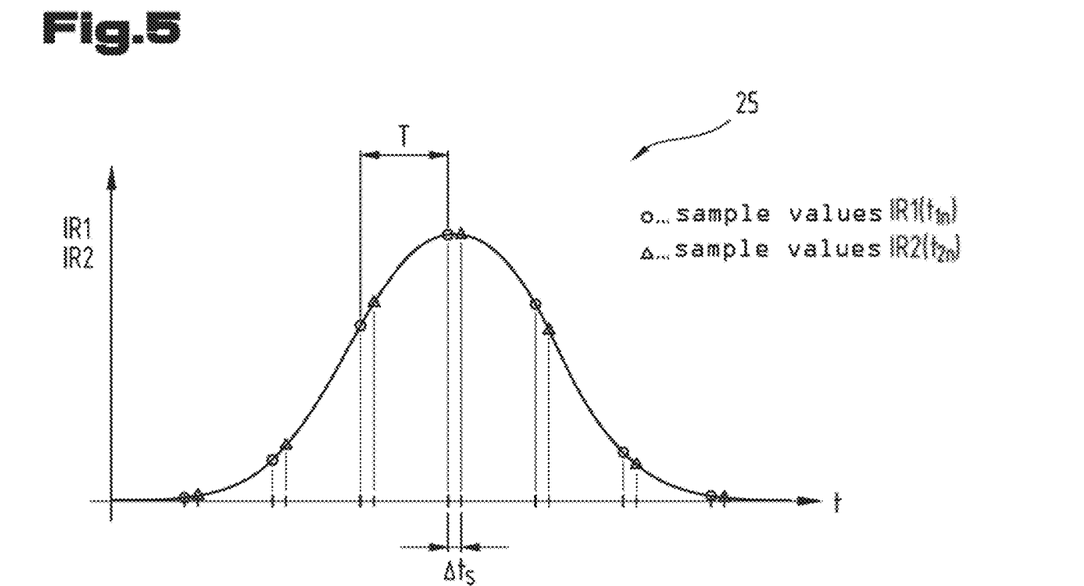
FIG. 5 an enlarged cutout from the intensity course of the reflected radiation pulse according to FIG. 4.

FIG. 5 shows a highly enlarged cutout of the intensity course of the reflected radiation pulse 25 in the range of the maximum of an intensity course, according to FIG. 4. In this regard, points in the course of the curve of the reflected radiation pulse 25 are highlighted by symbols as correspond to a measurement by sampling with the analog to digital converters ADC 19 and ADC 20. In this regard, there is a temporal distance in the extent of the time difference $\Delta t_s$ between measurement points of the first ADC 19 (symbol: circle) and measurement points of the second ADC 20 (symbol: triangle). This time difference $\Delta t_s$ corresponds to the system-caused difference in signal run times mentioned in the context of the description of FIG. 2 between the two receivers 9, 13 and the respective analog to digital converters ADC 19, 20 of the rangefinder 1. In the case of application of the first operating mode of the rangefinder 1, the phase shifter 22 generates a correspondingly large time difference $\Delta t_v$, by which it is achieved that digital values of the first ADC 19 and the second ADC 20 can each be added up to one another to a sum value, which correspond to the intensities of reflected radiation detected by the first receiver 9 and the second receiver 13 in each case to the same point in time. The temporal distances shown in FIG. 5 are reduced to zero by the phase shifter 22 in this regard. Moreover, a time difference $\Delta t$ may also be put into relation to the period T of the clock signal of the oscillator 21, wherein a full phase and/or the period T corresponds to the full angle 360°. A correction with the phase shifter 22 is preferably performed where the phase shift corresponding to the time difference $\Delta t_s$ is larger than 10°, preferably where it is larger than 15°. In case of a phase shift of less than 20°, a compensation may also be dispensed with.

Figure 6:
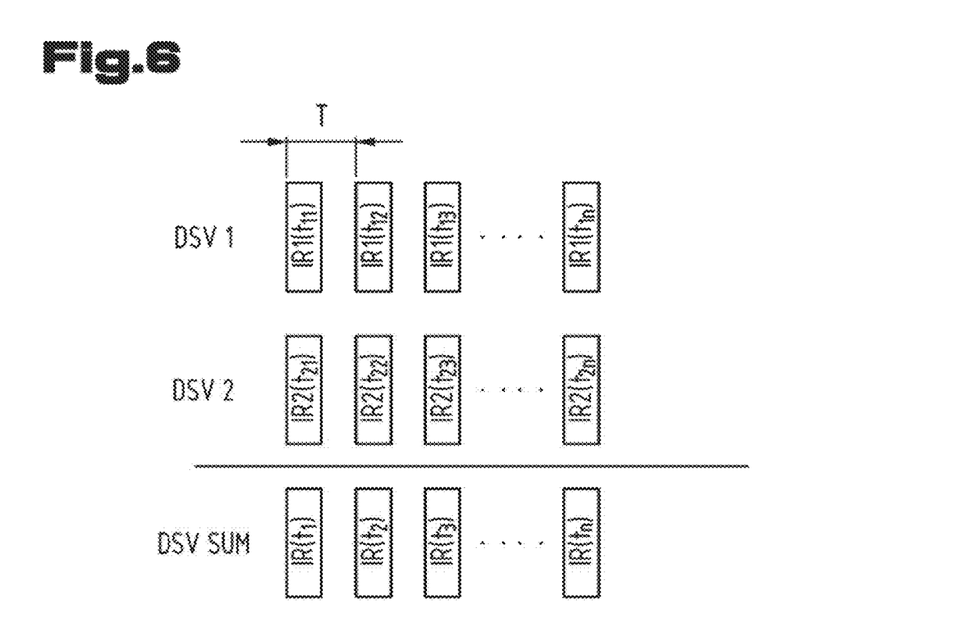
FIG. 6 a schematic representation of the digital measurement values according to the first operating mode of the rangefinder.

FIG. 6 shows a schematic representation of the digital measurement values of the reflected radiation pulse 25 in the operating mode of the rangefinder 1, in which the digital values of the detected radiation intensities of the two receivers 9, 13 are each added up to a sum value. In this regard, in sampling by the analog to digital converters ADC 19 and ADC 20, the generation of the time difference $\Delta t_v$ by the phase shifter 22 is considered (FIG. 2). In the tabular representation according to FIG. 6, the first line "DSV 1" symbolizes the digital signal vector of the first ADC 19 with the digitized radiation intensity values $IR1(t_{11})$, $IR1(t_{12})$, $IR1(t_{13})$, . . . and the second line "DSV 2" symbolizes the signal vector of the second ADC 20 with the radiation intensity values $IR2(t_{21})$, $IR2(t_{22})$, $IR2(t_{23})$, . . . . Lastly, the third line "DSV SUM" shows the summed up digital signal vector with the values $IR(t_1)$, $IR(t_2)$, $IR(t_3)$, . . . . The temporal distance within the respective lines, from measurement value to measurement value, corresponds to the clock signal of the oscillator 21, i.e. to the period T.

As shown in FIG. 6, digitized intensity courses measured in like manner of many individual and consecutive pulse responses are summed up to a sum signal vector prior to the determination of the pulse run time 26, in order to average out the noise and increase the SNR.

Figure 7:
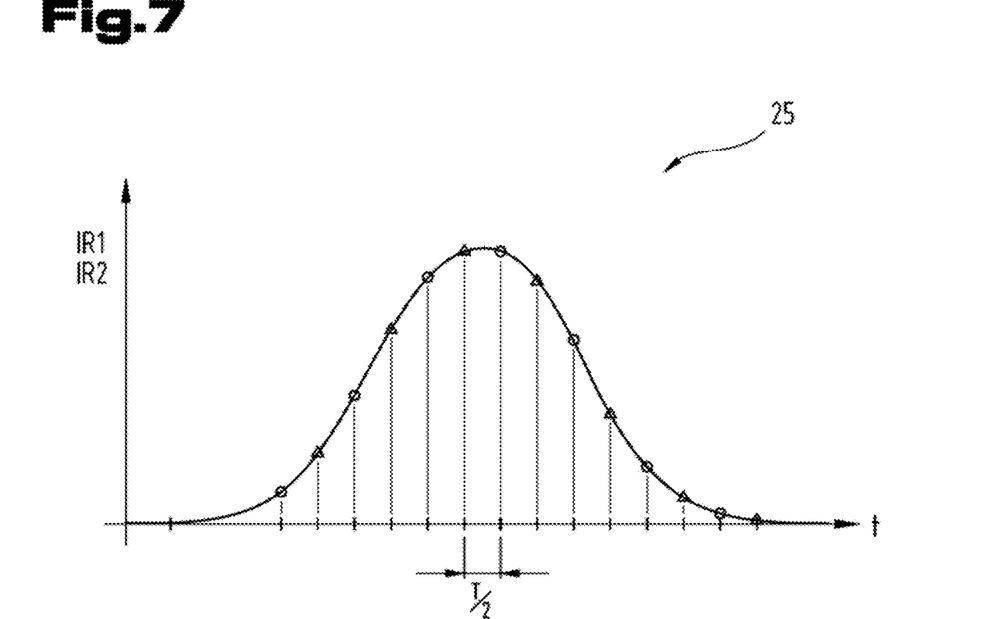
FIG. 7 a cutout from the intensity course of the reflected radiation pulse according to FIG. 4, at double the sampling rate.

FIG. 7 shows a cutout of the intensity course of the reflected radiation pulse 25, according to FIG. 4, to illustrate the operating mode of the rangefinder 1 in which the sampling of the reflected radiation pulses 25 with the first ADC 19 and the second ADC 20 is performed being alternately phase-shifted in each case by half a period T. Thus, in this operating mode (according to the second exemplary embodiment of the electro-optical rangefinder 1), temporal distances of the length of half a period T of the clock signal of the oscillator 21 are in each case between points in time of sampling the digital values of the radiation intensities of the reflected radiation pulse 25. To illustrate this, digital data of the first ADC 19 is indicated by a circle symbol and digital data of the second ADC 20 is indicated by a triangle on the curve of the reflected radiation pulse 25.

Figure 8:
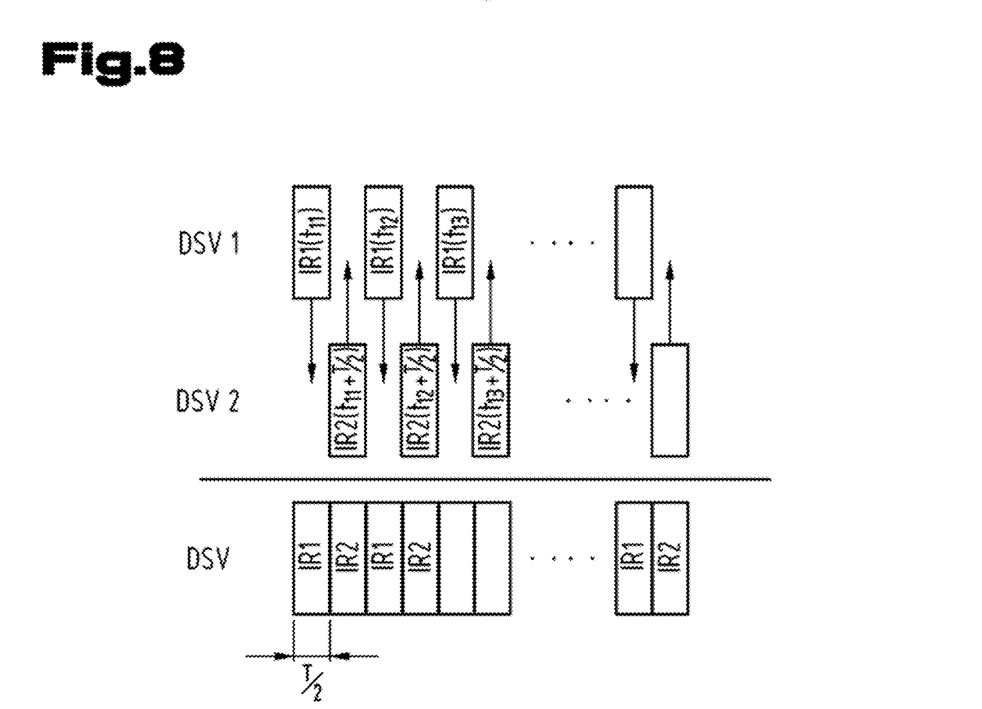
FIG. 8 a schematic representation of the digital measurement value in the operating mode with double the sampling rate according to FIG. 7.

FIG. 8 shows a symbolic representation of the digital values and/or the digital signal vectors, as corresponds to the situation of the second operating mode of the rangefinder 1 described in FIG. 7. In this regard, in the first line of the tabular scheme, digital data (e.g. 8-bit values) of the measurement values of the first digital signal vector "DSV 1" is shown and in the second line, digital data of the measurement values of the digital signal vector "DSC 2" is shown. In this regard, the temporally alternating sequence of the values of the first digital signal vector DSV 1 and the values of the second digital signal vector DSV 2 is indicated in FIG. 8 by a lateral offset between the first and the second line. Lastly, an overall digital signal vector "DSV" is generated by the controller 16 and/or the FPGA, wherein the values of this digital signal vector DSV are formed by an interleaving and/or interlacing of the values of the first and the second digital signal vector DSV 1, DSV 2. The thus obtained digital signal vector DSV corresponds to a measurement of the intensity course of the reflected radiation pulse 25 with twice as high of a sampling rate as corresponds to the frequency of the clock signal of the oscillator 21.

Of course, the method described above for improving the measured signal by summing up many individual measurements is also possible in combination with the two new operating modes. This is possible such that in a first step, the two ADCs are operated in the different operating modes as described and, in a second step, the resulting individual DSVs (FIG. 6: DSV SUM or FIG. 8: DSV) are summed up again to form a new sum signal vector.

Figure 9:
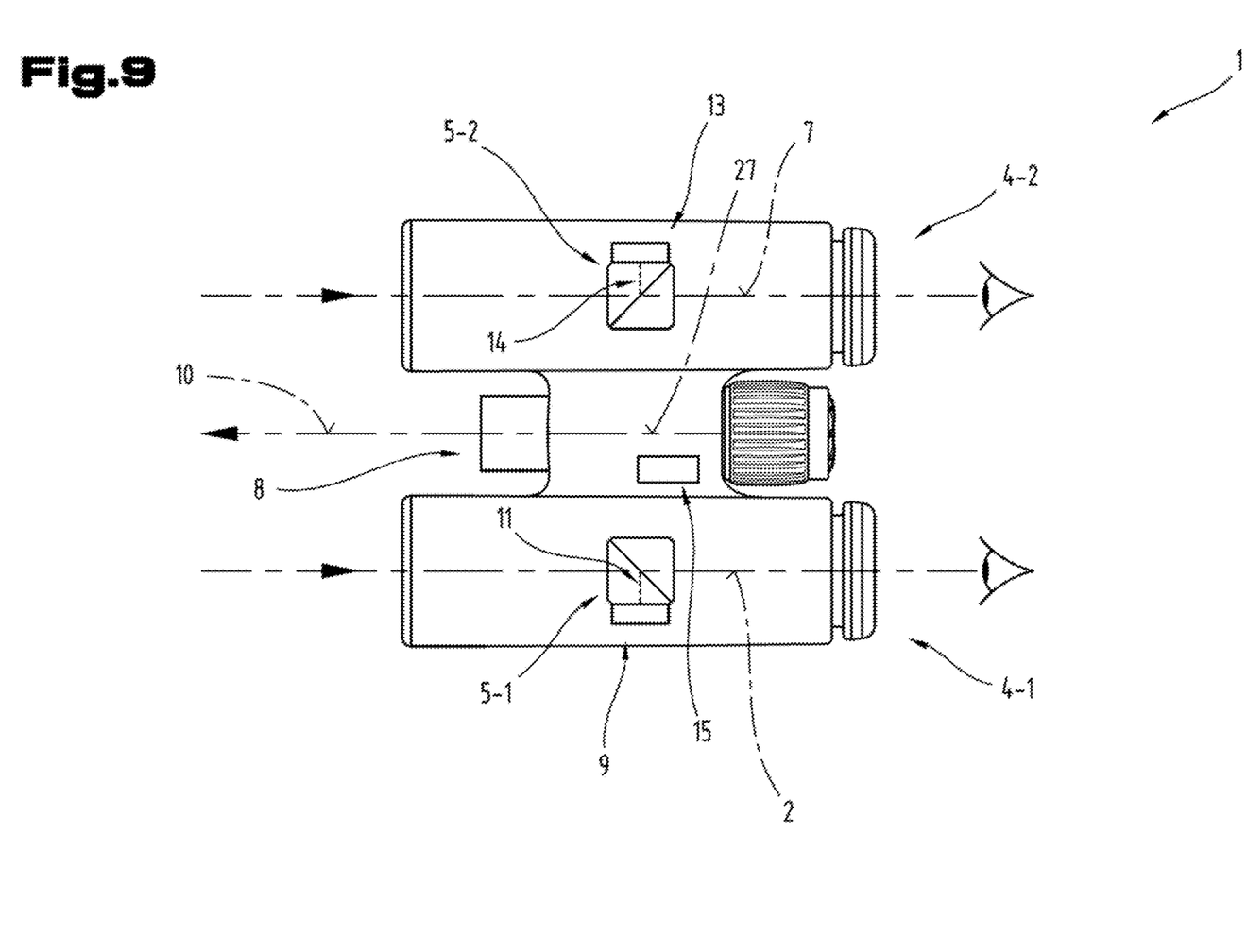
FIG. 9 an alternative exemplary embodiment of the rangefinder.

FIG. 9 shows an alternative exemplary embodiment of the electro-optical rangefinder 1 in the form of a binocular. In this regard, the first receiver beam path 11 of the first receiver 9 extends at least partially in the first observation beam path 2 of the first tube of the binocular and analogously thereto, the second receiver beam path 14 of the second receiver 13 extends at least partially in the second observation beam path 7 of the second tube of the binocular. According to this exemplary embodiment, it is provided that the transmission beam path 10 of the transmitter 8 of the rangefinder 1 is arranged at a distance from the two observation beam paths 2, 7. According to the representation in FIG. 9, the transmitter 8 is arranged approximately centrally between the two tubes of the binocular. Preferably, the transmitter 8 is arranged and/or aligned coaxially to a hinge axis 27 of a hinged bridge of the binocular. By beam splitters, such as boarder surfaces of the erecting systems 5-1, 5-2 acting as beam splitters, reflected radiation pulses 25 are decouples from the observation beam paths 2, 7 and arrive at the receivers 9, 13 by which they are detected. Measurement signals from the receivers 9, 13 are lastly further processed by the control and evaluation unit 15. The performance of measurements may be carried out using the rangefinder 1 according to the embodiment of FIG. 9 in like manner as described above as the first and second operating mode.

Figure 10:
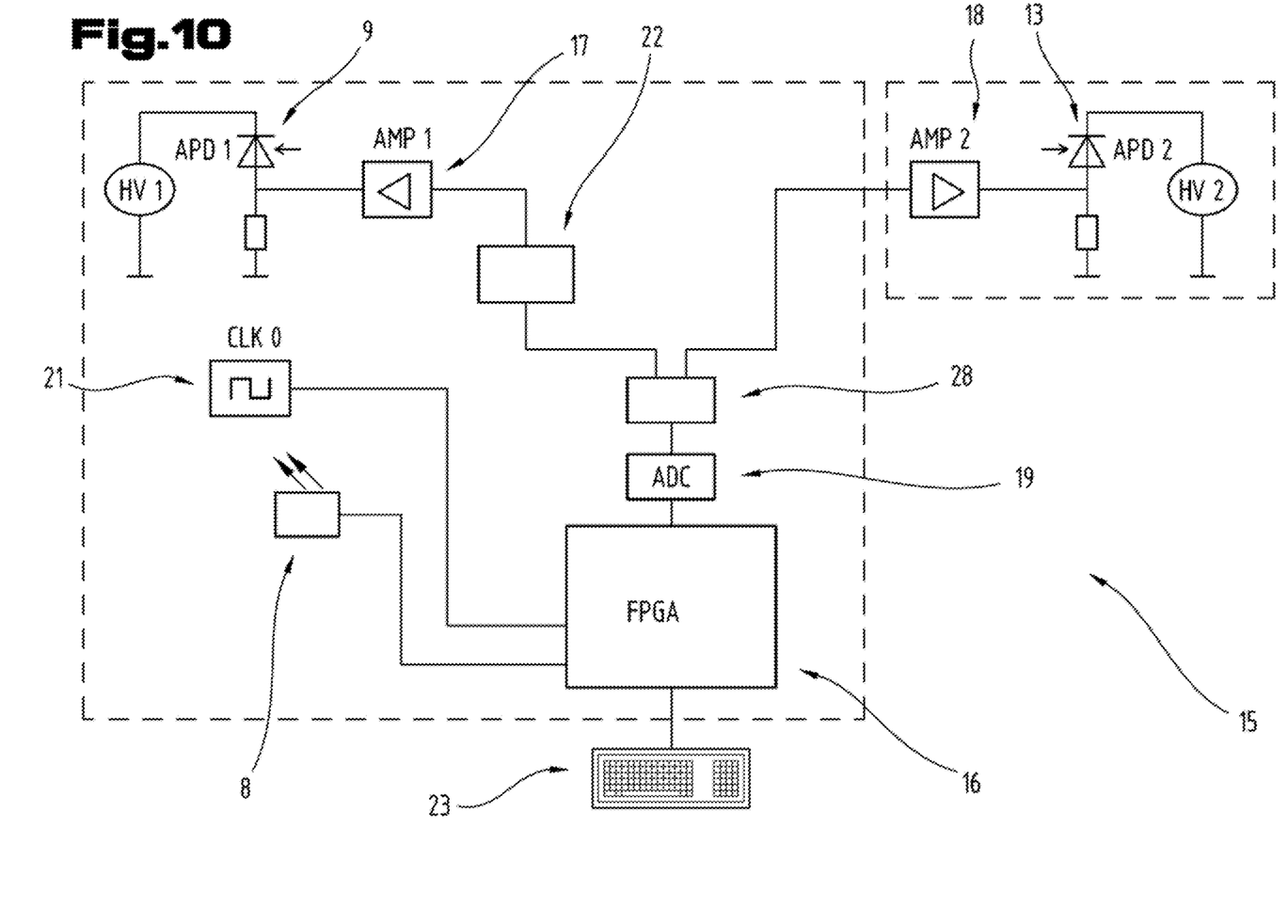
FIG. 10 an alternative exemplary embodiment of the control and evaluation unit of the rangefinder.

FIG. 10 shows an alternative exemplary embodiment of the control and evaluation unit 15 of the rangefinder 1, shown as a simplified schematic diagram. In like manner as in the exemplary embodiment which was described by means of FIG. 2, the receivers 9, 13 detect intensity courses of the reflected radiation and/or reflected radiation pulses 25. According to this exemplary embodiment of the rangefinder 1, it is provided that the analog signals from the receivers 9, 13 are added up to a sum signal after amplification (amplifier 17, 18) by a summing amplifier 28. This analog sum signal is then converted into a digital signal by the ADC 19. In this exemplary embodiment of the electro-optical rangefinder, the phase shifter 22 is arranged between the first receiver 9 and/or the first amplifier 17 and the summing amplifier 28. Thus, a synchronization of the analog measurement signals obtained from the first receiver 9 and the second receiver 13 is also achieved by the variable time difference $\Delta t_v$ generated by the phase shifter 22. The phase shifter 22 preferably comprises a delay line.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. An electro-optical rangefinder for a telescope having a transmitter and a transmission beam path and having a first receiver and a first receiver beam path, wherein the first receiver beam path extends at least partially in a first observation beam path of the telescope, characterized in that a second receiver with a second receiver beam path, which is aligned at least approximately in parallel to the transmission beam path, is formed, wherein the second receiver beam path is arranged at a distance from the first observation beam path of the telescope.

2. The rangefinder according to claim 1, wherein the second receiver beam path extends at least partially in a second observation beam path of the telescope.

3. The rangefinder according to claim 1, wherein the transmission beam path extends at least partially in the first observation beam path of the telescope.

4. The rangefinder according to claim 1, where the rangefinder comprises evaluation electronics with an oscillator for generating a clock signal, with a first ADC for the first receiver and with a second ADC for the second receiver.

5. The rangefinder according to claim 4, wherein the first ADC is configured for generating digital values of a first intensity course of reflected radiation $IR1(t1_n)$, detected by the first receiver, at points in time $t1_n$ determined by the clock signal, and that the second ADC is configured for generating digital values of a second intensity course of reflected radiation $IR2(t2_n)$, detected by the second receiver, at points in time $t2_n$ determined by the clock signal.

6. The rangefinder according to claim 5, wherein the evaluation electronics comprises a phase shifter for generating a variable time difference $\Delta t_v$ between the points in time $t1_n$ of a sampling of the first ADC and the points in time $t2_n$ of a sampling of the second ADC.

7. The rangefinder according to claim 6, wherein the phase shifter comprises a phase-locked loop (PLL).

8. The rangefinder according to claim 6, wherein the phase shifter comprises a delay line with a defined line length.

9. The rangefinder according to claim 1, further comprising a controller having a processor, in particular having an FPGA (field programmable gate array).

10. The rangefinder according to claim 9, wherein a first operating mode, in which the digital values of the detected radiation intensities of the two receivers are added to a summed value in a synchronized manner, and a second operating mode, in which sampling of the reflected radiation intensity by the two receivers is performed alternately shifted in phase by half a period T, are provided.

11. The rangefinder according to claim 10, further comprising an operator terminal connected to the controller, wherein the operator terminal is suitable for selecting different operating modes.

12. The rangefinder according to claim 1, further comprising evaluation electronics with an oscillator for generating a clock signal, having a summing amplifier for adding the measurement signals from the two receivers to a sum signal and having an ADC for converting the sum signal.

13. The rangefinder according to claim 12, wherein a phase shifter is arranged between the first receiver and the summing amplifier.

14. The rangefinder according to claim 13, wherein the phase shifter comprises a delay line with a defined line length.

15. A method for measuring the distance of an object using an electro-optical rangefinder, wherein radiation is emitted by a transmitter and the radiation is directed onto the object by a transmission beam path, and wherein radiation reflected by the object is detected by a first receiver, and wherein a temporally changeable intensity course of the reflected radiation $IR1(t)$ detected by the first receiver is recorded, and wherein the distance of the object is calculated from a run time of the radiation from the transmitter to the first receiver, wherein radiation reflected by the object is detected by a second receiver and a temporally changeable intensity course of the reflected radiation $IR2(t)$ detected by the second receiver is recorded, wherein digital values of the first intensity course $IR1(t1_n)$ are generated from the first intensity course $IR1(t)$ by a first ADC at points in time $t1_n$ determined by a clock signal, and wherein digital values of the second intensity course $IR2(t2_n)$ are generated from the second intensity course $IR2(t)$ by the second ADC at points in time $t2_n$ determined by the clock signal, wherein the points in time $t2_n$ are phase-shifted by a time difference $\Delta t$ as compared to the points in time $t1_n$, wherein the time difference $\Delta t$ is composed of a system-caused part $\Delta t_s$ and a variable part $\Delta t_v$.

16. The method according to claim 15, wherein a value of the variable time difference $\Delta t_v$ is selected to be so high that the points in time $t1_n$ and $t2_n$ each correspond to an equal point in time of the intensity courses of the reflected radiation IR1(t), IR2(t) at the first receiver and at the second receiver, and that subsequently the values of the first intensity course $IR1(t1_n)$ and the values of the second intensity course $IR2(t2_n)=IR2(t1_n)$ are each added up to one another.

17. The method according to claim 15, wherein a value of the variable time difference $\Delta t_v$ is selected to be so high that the points in time $t1_n$ and $t2_n$ each correspond to points in time of the intensity courses of the reflected radiation IR1(t), IR2(t) at the first receiver and at the second receiver, which are phase-shifted to one another by the value of half a period T of the clock signal, and that subsequently, from the values of the first intensity course $IR1(t1_n)$ and from the values of the second intensity course $IR2(t2_n)$, a total intensity course $IR(t_n)$ with double the temporal resolution, in the form $IR1(t1_n)$, $IR2(t1_n+T/2)$, $IR1(t1_{n+1})$, $IR2(t1_{n+1}+T/2)$, $IR1(t1_{n+2})$, $IR2(t1_{n+2}+T/2)$, and so on, is formed.

18. A method for measuring the distance of an object using an electro-optical rangefinder, wherein radiation is emitted by a transmitter and the radiation is directed onto the object by a transmission beam path, and wherein radiation reflected by the object is detected by a first receiver, and wherein a temporally changeable intensity course of the reflected radiation IR1(t) detected by the first receiver is recorded, and wherein the distance of the object is calculated from a run time of the radiation from the transmitter to the first receiver, wherein radiation reflected by the object is detected by a second receiver and a temporally changeable intensity course of the reflected radiation IR2(t) detected by the second receiver is recorded, wherein measurement signals from the first receiver are phase-shifted by a variable time difference $\Delta t_v$ relative to measurement signals from the second receiver by a phase shifter.

19. The method according to claim 18, wherein a value of the variable time difference $\Delta t_v$ is selected to be so high that points in time corresponding to the measurement signals IR1(t) and IR2(t) each correspond to an equal point in time of the intensity courses of the reflected radiation IR1(t), IR2(t) at the first receiver and at the second receiver, and that subsequently the measurement signals of the intensity courses of the reflected radiation IR1(t) and IR2(t) are added up by a summing amplifier to a sum signal.

* * * * *